United States Patent [19]
Osterholt

[11] 3,727,504
[45] Apr. 17, 1973

[54] MEAT SLICING KNIFE

[76] Inventor: Anthony H. Osterholt, 4608 Euclid Avenue, Fort Wayne, Ind. 68806

[22] Filed: Aug. 5, 1971

[21] Appl. No.: 169,213

[52] U.S. Cl. ..........83/483, 83/490, 83/830; 30/165; 144/162 R
[51] Int. Cl. ..............................................B26d 4/48
[58] Field of Search........................146/67, 95, 106; 83/676

[56] References Cited

UNITED STATES PATENTS 1,973,526  9/1934  Diamond et al........................146/95

FOREIGN PATENTS OR APPLICATIONS 525,145  5/1927  Germany................................146/67
846,955  8/1952  Germany................................83/676

Primary Examiner—Andrew R. Juhasz
Assistant Examiner—John Sipos
Attorney—Harold B. Hood et al.

[57] ABSTRACT

A rotary meat slicing knife for use in a machine for slicing steaks, chops and the like from larger pieces of meat. The knife comprises a blade having a convexly curved, uninterrupted, sharpened cutting edge extending continuously between opposite extremities, the blade being mounted for eccentric rotation in a given direction. One side of the blade has a plurality of circumferentially contiguous segments formed thereon adjacent the cutting edge and extending between its extremities, each of the segments comprising a surface which smoothly tapers away from the cutting edge and which also smoothly tapers in the direction of rotation toward the other side of the blade to the adjacent segment thereby forming a compound wedge configuration pointing toward the cutting edge and in the direction of rotation for separating a slice of meat from a larger piece upon one revolution of the blade.

8 Claims, 9 Drawing Figures

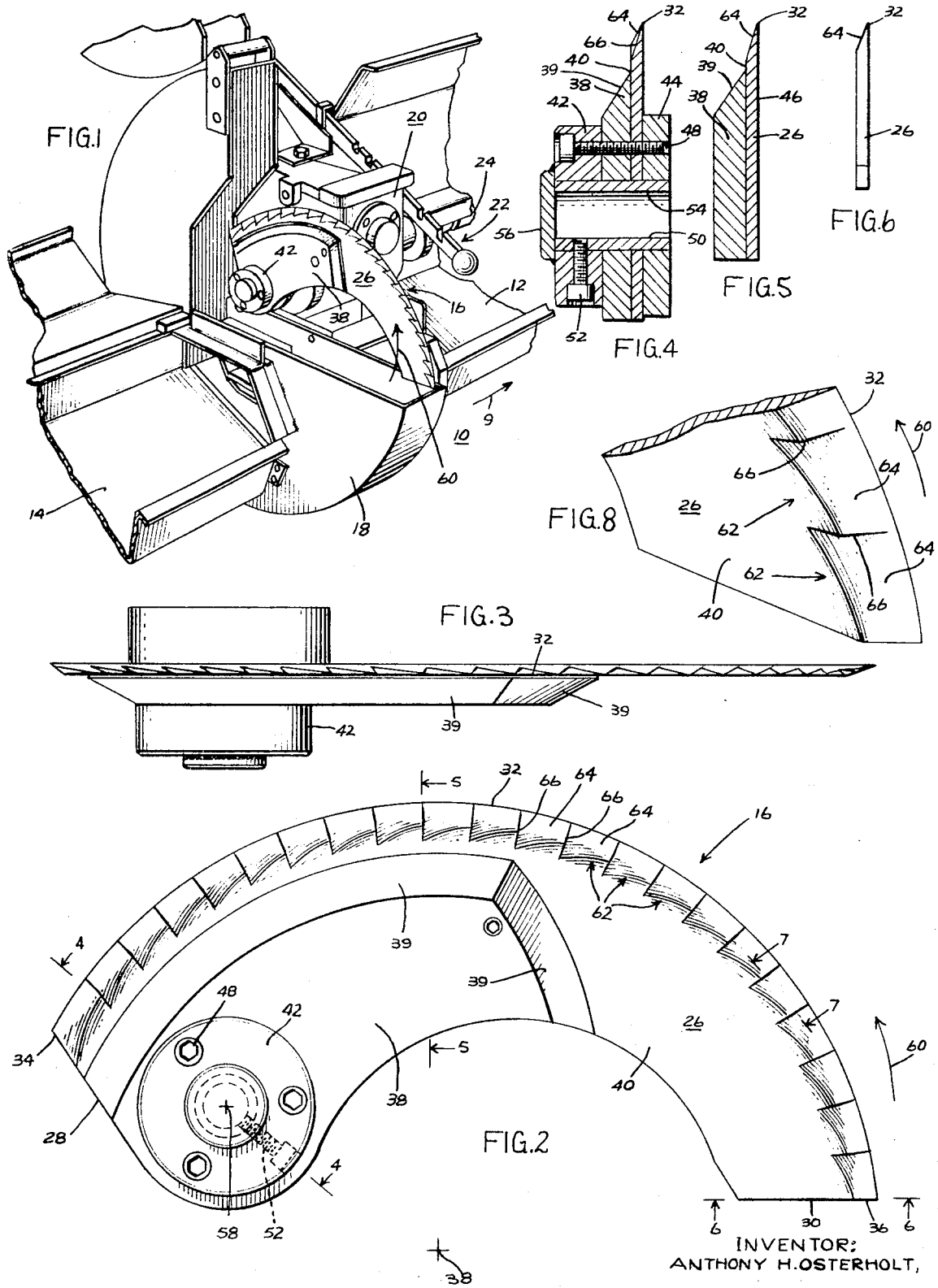

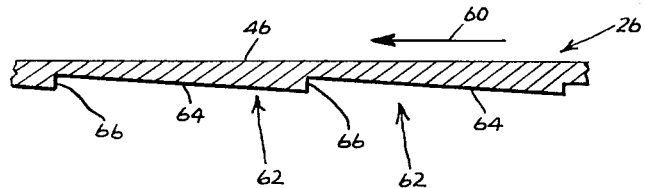
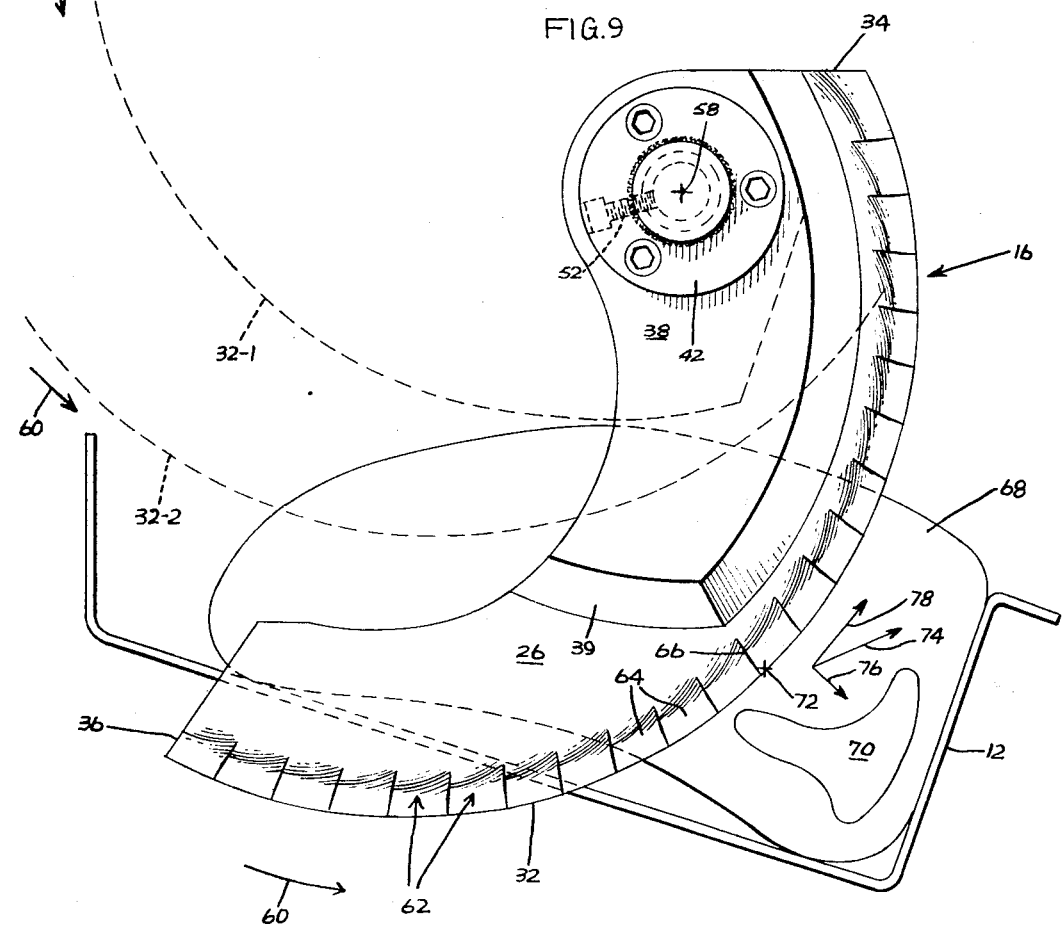

3,727,504

MEAT SLICING KNIFE

BACKGROUND OF THE INVENTION

1. Field of the Invention

This invention relates generally to a rotary meat slicing knife for severing a slice of meat from a larger piece upon one revolution thereof.

2. Description of the Prior Art

Slices of meat, such as steaks, chops or slices of ham, have been commonly cut from a larger piece of meat, such as a loin or whole ham, by a meat cutting band saw, appreciable operator time being required for cutting a quantity of such slices. A production meat slicing machine has been introduced which automatically feeds a large piece of meat to a rotating, eccentric knife blade which severs one piece of meat from the larger piece upon each revolution of the blade. The knife blade employed in that machine is generally crescent-shaped with a convexly curved cutting edge, the blade being mounted for eccentric rotation adjacent one of its ends and the cutting edge having serrations formed therein.

SUMMARY OF THE INVENTION

A rotary meat slicing knife comprising a blade having opposite sides and a convexly curved, uninterrupted, sharpened cutting edge extending continuously between opposite extremities. Means are provided for mounting the blade for eccentric rotation in a given direction about an axis normal to the blade sides with the leading one of the cutting edge extremities being more closely spaced from the axis of rotation than the trailing one of the extremities. One side of the blade has a plurality of circumferentially contiguous segments formed thereon adjacent said cutting edge and extending between the cutting edge extremities. Each of the segments comprises a surface which smoothly tapers away from the cutting edge and which also smoothly tapers in the direction of rotation toward the other side of the blade to the adjacent segment thus forming a compound wedge configuration pointing toward the cutting edge and in the direction of rotation for separating a slice of meat from a larger piece upon one revolution of the blade.

It is accordingly an object of the invention to provide an improved rotary meat slicing knife.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a fragmentary view in perspective, partly broken away, illustrating a meat slicing machine incorporating the improved rotary meat slicing knife of the invention;

FIG. 2 is a side view of the rotary meat slicing knife of the invention;

FIG. 3 is a top view of the knife of FIG. 2;

FIG. 4 is a cross-sectional view taken generally along the line 4—4 of FIG. 2;

FIG. 5 is a cross-sectional view taken generally along the line 5—5 of FIG. 2;

FIG. 6 is an end view as viewed generally along the line 6—6 of FIG. 2;

FIG. 7 is a fragmentary cross-sectional view taken generally along the line 7—7 of FIG. 2;

FIG. 8 is a fragmentary view in perspective further illustrating the wedge segments of the knife of the previous figures; and FIG. 9 is another side view of the knife of the invention illustrating its slicing action.

DESCRIPTION OF THE PREFERRED EMBODIMENT

Referring now to FIG. 1, there is shown a portion of a meat slicing machine, generally indicated at 10, having a meat loading and feeding bin 12, a slice-receiving bin 14, and the improved rotary meat slicing knife 16 of the invention mounted for rotation between bins 12 and 14 within guard 18. Knife 16 is driven by a suitable motor (not shown) through gear box 20. Suitable meat feeding mechanism 22, which does not form a part of the present invention, is actuated by lead screw 24 driven by gear box 20, and incrementally feeds the piece of meat in bin 12 forwardly under knife 16 in response to each revolution thereof thereby to slice off one slice of the desired thickness.

Referring now to FIGS. 2 through 7 of the drawings, knife 16 comprises generally crescent-shaped blade 26 having opposite ends 28, 30 and convexly curved, uninterrupted, sharpened cutting edge 32 having its opposite extremities 34, 36 terminating at blade ends 28, 30. In the illustrated and preferred embodiment, cutting edge 32 is accurately curved having the center of its radius of curvature located as shown at 38 in FIG. 2.

Back-up plate 38 engages side 40 of blade 26, mounting hub 42 engages back-up plate 38, and mounting hub 44 engages side 46 of blade 26, blade 26, back-up plate 38 and mounting hubs 42, 44 being held in assembled relation by suitable screws 48. Back-up plate 38 has beveled edges 39 facing cutting edge 32. Sleeve 50 extends through openings in blade 26, back-up plate 38 and mounting hubs 42, 44 and is secured thereto by suitable screws, one of which is shown at 52. Knife 16 is adapted to be mounted on the output shaft (not shown) of gear box 20 by means of sleeve 50 which has a keyway 54 therein for keying knife 16 to the output shaft. Cap 56 covers one end of sleeve 50 and is secured to mounting hub 42, as be welding.

It will now be seen that knife 16 is adapted to be mounted for eccentric rotation about axis 58 adjacent end 28 of blade 26. Knife 16 is rotated by the motor and gear box 20 in the direction shown by arrow 60, extremity 34 of cutting edge 32 thus being the leading extremity and being more closely spaced from axis of rotation 58 than the trailing extremity 36.

In accordance with the invention, side 40 of blade 26 has a plurality of circumferentially contiguous segments 60, 62 formed thereon adjacent cutting edge 32 and extending between extremities 34, 36. Each segment 62 is formed by surface 64 which, as viewed in transverse cross-section as seen in FIGS. 4, 5 and 6, tapers smoothly away from cutting edge 32 and, as viewed in longitudinal cross-section as shown in FIG. 7, also tapers smoothly in the direction of rotation 60 toward side 46 of the blade to the adjacent segment 62.

Side 46 of plate 26 is substantially flat and, by virtue of the taper of surface 64 in direction of rotation 60, each segment 62 is joined to the adjacent segment by a discrete trailing edge 66 which extends inwardly from cutting edge 32 and is preferably slightly inclined in direction of rotation 60, as best seen in FIG. 2. Tapered surface 64 of each segment 62 thus forms a compound wedge configuration which points toward cutting edge 32 and in the direction of rotation 60. Blade 26 may be formed of any suitable metal and in a specific embodiment is formed of D–2 air hardened tool steel.

Referring now to FIG. 9 of the drawings, the relationship of knife 16 to loading and feeding bin 12 is shown as viewed generally in the direction shown by the arrow 9 in FIG. 1, guard 18 being eliminated. A piece of meat 68 having bone 70 therein, such as a beef loin from which steaks are to be sliced, is shown positioned in bin 12. With knife 16 continuously rotating in direction 60, and with knife 16 generally in the position shown in FIG. 1, feeding mechanism 22 pushes piece 68 of meat forwardly the requisite distance so that upon the next revolution of knife 16, a slice of the desired thickness will be cut-off. In a specific embodiment, a 1,750 r.p.m. motor is employed with gear box 20 providing a 10 to 1 speed reduction thus driving knife 16 at 175 r.p.m. so as to provide 175 slices per minute.

The position of cutting edge 32 immediately prior to beginning a slicing operation is shown in dashed lines at 32–1, and intermediate positions during the slicing operation are shown in dashed lines at 32–2 and in solid lines in FIG. 9. Considering now point 72 on cutting edge 32, the path of movement of point 72 about axis 58 is shown by arrow 74. The path of movement 74 of point 72 can be vectorially resolved into component 76 normal to cutting edge 32 and component 78 tangent to cutting edge 32, it being observed that the compound wedge configuration formed by the tapered surface 64 of the respective segment 62 is likewise tapered or pointed in directions 76, 78. It will further be seen that the wedges formed by surfaces 64 of the segments 62 progressing toward trailing extremity 36 are moving at progressively higher linear rates of speed. Thus, the cumulative effect of the slicing action of the "flying" wedges formed by tapered surfaces 64 is smoothly to separate the slice of meat from piece 68, wedges 64 and tapered edges 39 of back-up plate 38 ejecting the resulting slice into receiving bin 14.

The improved slicing knife 16 of the invention provides smoother, easier and faster cutting with less power than prior art machines.

While the flying wedge cutting edge configuration of the invention is particularly applicable to rotary meat slicing knives, as described above, it is also applicable to other types of slicing knives.

While there have been described above the principles of this invention in connection with specific apparatus, it is to be clearly understood that this description is made only by way of example and not as a limitation to the scope of the invention.

What is claimed is:

1. A rotary meat slicing knife comprising a blade having opposite sides and a convexly curved, uninterrupted, sharpened cutting edge extending continuously between opposite extremities, and means for mounting said blade for eccentric rotation in a given direction about an axis normal to said sides with the leading one of said cutting edge extremities being more closely spaced from said axis than the trailing one of said extremities, one side of said blade having a plurality of circumferentially contiguous segments formed thereon adjacent said cutting edge and extending between said extremities, each of said segments comprising a surface which smoothly tapers away from said cutting edge and which also smoothly tapers in said direction toward the other side of said blade to the adjacent segment thereby forming a compound wedge configuration pointing toward said cutting and in said direction for separating a slice of meat from a larger piece upon one rotation of said blade.

2. The knife of claim 1 wherein said segments respectively have substantially the same size and configuration.

3. The knife of claim 1 wherein said other side of said blade is substantially flat.

4. The knife of claim 1 wherein said cutting edge is arcuate with the center of its radius of curvature spaced from said axis.

5. The knife of claim 1 wherein each of said segments is joined to the adjacent segment by a discrete trailing edge.

6. The knife of claim 1 wherein said blade is generally crescent-shaped and has opposite ends, said cutting edge extremities being respectively at said ends, said axis being adjacent one of said ends.

7. The knife of claim 6 wherein said segments have substantially the same size and configuration, said other side of said blade being substantially flat, said cutting edge being arcuate with the center of its radius of curvature spaced from said axis, each of said segments being joined to the adjacent segment by a discrete trailing edge.

8. A slicing blade having opposite sides and an uninterrupted, sharpened cutting edge extending continuously between opposite extremities, one side of said blade having a plurality of contiguous segments formed thereon adjacent said cutting edge and extending between said extremities, each of said segments comprising a surface which smoothly tapers away from said cutting edge and which also smoothly tapers toward one of said extremities and the other side of said blade to the adjacent segment thereby forming a compound wedge configuration pointing toward said cutting edge and said one extremity.

* * * * *